United States Patent Office 3,070,495
Patented Dec. 25, 1962

3,070,495
DECAYED WOOD EXTRACT AS TERMITE ATTRACTANT
Glenn R. Esenther, Thomas C. Allen, John E. Casida, and Roy D. Shenefelt, all of Madison, Wis., assignors to Wisconsin Alumni Research Foundation, Madison, Wis., a corporation of Wisconsin
No Drawing. Filed June 27, 1961, Ser. No. 119,837
13 Claims. (Cl. 167—48)

This invention relates to an attractant for termites and to a method for producing it.

The use of substances of various types, whether naturally derived, such as in the case of various sex attractants, or artificially produced, such as, for example, from combinations of various edible foodstuffs, to attract or lure insects into a situation when they can be more readily exterminated is well known. Prior to the present invention, however, it was not known that any attractive principle existed which was selective toward termites.

There has been much exploration into the relationship between fungi and termites since fungi are usually found in wood which is infested with termites or conversely, since termites are most often found in wood which has been subjected to the attack of wood-decaying fungi. Many theories have been advanced as to the association between fungi and termites. It was thought for example, that some mutualism existed between termites and fungi. In subscribing to the mutualism theory, it was believed by some that the fungus created strcutural or chemical changes in the wood which permitted the termite to more easily remove fibres from the wood being attacked and to assimilate such fibres in the digestion process. Others subscribed to the idea that the termites cropped the fungal growths along with wood fibres to supply a dietary deficiency. Specifically, the cropped fungi were thought to supply the termites with nitrogen containing compounds which were absent in the cellulose diet of the termite but which are essential to the termites' existence. Another theory is that the association of termites and fungi is merely the result of casual contact and that the two species are found together because the termites accidentally carried fungal spores into their tunnels and that these spores propagated readily in the tunnels because the ambient conditions in the tunnels are ideal for fungal growth. In no instance however, has a clear-cut relationship between fungi and the termite been established.

It has now been found that certain fungi, identified broadly as wood-decaying fungi, produce some principle during the decay process, apparently as a by-product of that process, which is highly attractive to termites. More importantly, it has been found that such principle can be readily extracted from wood which has been attacked by wood-decaying fungi and that the extracted principle can be utilized in a practical manner for detecting and controlling termite infestation.

It is an object of this invention to provide a substance which is highly attractive to termites.

A further object of this invention is to provide a method for obtaining such attractant.

A still further object of this invention is to provide a novel method for detecting termite infestations or for assaying the termite population in a given area.

Other objects and advantages will be apparent from the following detailed description.

The termite attracting principle of the present invention can be obtained by inoculating wood with a culture of a wood-decaying fungus, such as the well-known white rots, brown rots and soft rots and subjecting the inoculated wood to ambient conditions of temperature and humidity which are conducive to growth and proliferation of the fungus and thereby to cause decay of the wood. After decay of the wood has progressed to some extent, which is evidenced by proliferation of the mycelial structure of the fungus, the wood can be conviently macerated in distilled water and the resulting mass filtered. The filtrate will contain the attractive principle and have the property of attracting termites. Solvents other than water can, of course, be used to extract the principle which is attractive to termites.

Of the wood-decaying fungi which are generally applicable for purposes of this invention, the species *Lenzites trabea* Pers. ex Fries has been found eminently suitable.

The chemical identity of the termite attracting principle of this invention or whether it is comprised of one or many constituents, is not known nor are the reasons for its specificity to termites. It has been found, however, that the attractive principle can be obtained in accordance with this invention only if the wood-decaying fungus has been grown on a wood host. Thus, *Lenzites trabea* propagated on a malt agar medium exhibited no ability to attract termites; nor would the water, alcohol, ether, trichloroethylene or benzene extracts of the mycelium so grown elicit a response from termites. Similar solvent extracts from macerated sound wood, i.e., would which had not been attacked by fungus, also elicited no response from termites. Consequently, it appears that in attacking the wood the fungus produces some principle, presumably one of the products or by-products of such attack, which is attractive to termites and that growth and propagation of the fungus upon a wood host is essential to the formation of such principle.

The termite attracting principle to which this invention is directed has been obtained from decayed woods of both the coniferous and deciduous families. For example, utilizing *Lenzites trabea* as the wood-decaying fungus, the water extract of decayed southern pine, Englemann spruce, Douglas fir and white pine in the conifer family and of decayed red oak, beech, poplar and gum in the deciduous family, have all strongly attracted termites. Also, and rather unexpectedly in view of the well-recognized decay and insect resistant properties of redwood, the extract obtained from this wood which has been attacked by the fungus *Lenzites trabea* has been observed to attract termites.

The attractive principle of the present invention finds ready application as an aid in determining the presence of termites in a given area and in controlling termite infestations. For example, it may be used to stimulate the attention of termites and draw them to the site of the principle where facilities can be provided for their extermination. Or, the attractive principle may be used to impregnate wooden stakes which can then be driven into the ground in an area where it is suspected that termites are present. Then after an appropriate period of time, which can vary widely because of local conditions, one or more stakes can be excavated along with the immediate area and an assay made of the termite population.

If desired, the attractive principle of this invention can be used in conjunction with an insecticide with which it is compatible and which is effective against termites. Examples of various insecticides which can be effectively used in combination with the attractive principle of this invention are: dichloro-diphenyl-trichloroethane (DDT); various halogenated-polycyclic insecticides such as aldrin (a product consisting essentially of 1,2,3,4,10,10-hexachloro - 1,4,4a,5,8,8a - hexahydro - 1,4,5,8 - endo-exo-dimethano-naphthalene), isodrin (a product consisting essentially of the stereoisomers of aldrin having the endo, endo configuration), Dieldrin (a product consisting essentially of the 6,7-epoxy derivative of aldrin) and endrin (a product consisting essentially of the endo, endo isomer of Dieldrin); chlordane (octachloro-4,7-methoano-tetrahydroindane); parathion (O,O-diethyl-O-paranitrophenyl thiophosphate); malathion (O,O-dimethyl dithiophosphate of diethyl mercaptosuccinate); and heptachlor (1,4,5,6,7,8,8-heptachlor-3a,4,6,6a-tetrahydro-4,7-methanoindene).

Another advantageous form in which the attractive principle of this invention finds application is in admixture with an insecticide in an insecticidal composition. As is well known, in insecticidal compositions, the insecticide itself may make up only a small portion thereof, the remainder being an appropriate vehicle. The particular vehicle selected will, of course, depend upon the physical form which is desired for the insecticidal composition. If the composition is to be in liquid form, a suitable solvent for the attractant and the insecticide must be employed. The solvent selected will also, of course, depend upon its compatibility with both the attractant and the insecticide. Additional considerations must also be given to compatibility of ingredients if the composition is to be expelled from a container in the well known aerosol form. If the composition is to be in powder form the usual inert powdered vehicle materials, such as clays, talc, pyrophyllite and the like can be employed.

The attractive principle of this invention is effective in eliciting a response from termites in very small amounts. For example, it has been found that the aqueous extract from one gram of dry rotted wood (*Lenzites trabea* was the active fungal agent) can be diluted to six liters with distilled water and that a 0.03 ml. aliquot at such dilution is still adequate for attracting termites.

If desired, in making the attractive principle of this invention where the principle has been extracted from decayed wood with distilled water, further concentration of the principle can be accomplished by extracting the aqueous extract with ether. The ether extract can then be purified further by chromatographing on fluorsil columns with a benzene-ether elution gradient. The attractive principle was observed to elute at about a 95:5 benzene-ether mixture. 0.1 microgram of the resulting colorless oil was found to elicit a response from termites.

The following examples, which are illustrative only and are not intended to limit the scope of the invention in any way, are effective to show the effect of the termite attractive principle of this invention.

*Example I*

Three replicate sets of soil bottles containing moistened soil overlaid with a thin strip of wood (feeder block) were inoculated with the fungus *Lenzites trabea* and incubated at 80° F. and 70% relative humidity until the feeder blocks were covered with mycelium. (Technique described in the American Society for Testing Materials, 1956. "Tentative Method for Testing Wood Preservatives by Laboratory Soil-Block Cultures." ASTM Designation: D1413–56T.) Comparable blocks placed in non-inoculated bottles served as controls.

Autoclaved test blocks of western white pin sapwood (dimensions ¾ x ¾ x 2¾ inches) were inserted in the bottles on top of the feeder blocks and the bottles were kept in an incubation room (80° F. and 70% relative humidity) for 15–20 days. The test blocks were then removed and marked at the limits of the types of mycelial growth present on the block as follows:

(1) A basal range—covered by older woolly mycelium some of which was in a collapsed stage;
(2) A mid range—covered by vigorous mycelium characterized by a cottony appearance; and
(3) A top range with no visible mycelium The mycelium was brushed from the blocks and each block was cut into sections corresponding to the marked ranges. The basal portion of the *Lenzites trabea*-infested block was placed in an open dish on damp sand and a corresponding piece of uninoculated wood was also placed on the sand in the dish. Termites were introduced into the dish and, in spite of the fact that the termites were kept in the light and subjected to the desiccating effects of the air, there was an immediate response by the termites to the *Lenzites trabea*-infested block so that after a very short time the termites were clustered about this block.

*Example II*

The procedure of Example I was followed up to the point of assaying the ability of the fungus-infested block to attract termites by placing the block itself in a container. Instead of this technique, a small portion of the basal section of the *Lenzites trabea*-infested block was macerated in distilled water and the resulting mixture was filtered. A small piece of sponge was treated with the filtrate. A second piece of sponge was treated with distilled water. Both pieces of sponge were set on sand in a Petri dish and termites were dropped into the dish between the sponges. Within a few minutes the termites were clustered on the sponge which had been treated with the filtrate and remained there.

*Example III*

The test blocks prepared in Example I and used in the assay described in that example were allowed to dry slowly for three weeks at room temperature. After drying these blocks were again extracted with distilled water as in Example II. The attractive principle was still present in the new filtrate as indicated by the rapid response (within about 30 seconds) of termites to the filtrate in accordance with the assay described in Example II.

In all of the preceding examples, the efficacy of the attractive principle in eliciting a response from termites was determined with eastern subterranean termite, *Reticulitermes flavipes* (Kol).

Pieces of white pine were inoculated with species of fungus other than *Lenzites trabea* and assayed as described in Example I. Of the fungi tested, *Polyporus versicolor* Linnaeus ex Fries and *Aspergillus* sp.; also gave evidence of producing a principle attractive to termites.

The attractive principles of this invention were found to be effective in eliciting a response from species of termites other than *Reticulitermes flavipes* (Kol). For example mixed castes, excluding macropterous forms of *R. virginicus* Banks and a Costa Rican termite, *Nasutitermes columbicus* (Holmgren), were found to respond rapidly to the attractant. Also, favorable response was not limited to those termites classified as subterranean termites but was also found in the damp wood and dry wood classes of termites.

*Example IV*

Small 15 mm. blocks of wood prepared as indicated in Example I were placed in two sets of Petri dishes to determine the efficacy of the attractive principle on the Costa Rican termite. Two drops of distilled water was added to each of a block of fungus-invaded wood and a block of uninvaded wood in the dishes. Twenty-five of the worker caste of the species *Nasutitermes columbicus* (Holmgren) were placed in each of the two sets of Petri dishes. Within ten minutes all of the workers in one dish and 90% of the workers in the other dish had gathered on the fungus-invaded block. Within 12 hours 100% of the termites in both dishes had gathered on the fungus-invaded blocks and remained on these blocks as long as observations were made over a period of 48 hours.

*Example V*

The procedure of Example IV was followed except that the soldier caste of *Nasutitermes columbicus* (Holmgren) was used with similar results.

Example VI

Fine wood cuttings from the fungus-invaded wood of the foregoing examples and from uninvaded wood were placed in separate test tubes. Distilled water was added to each of the test tubes and the wood cuttings were macerated and allowed to stand in the distilled water for one hour. Three drops of the water extract from the invaded wood was added to each of two paper discs and three drops of the water extract from the uninvaded wood was added to each of two other paper discs. The thus treated discs were then placed in a Petri dish and termites of the worker caste of *Nasutitermes columbicus* were added to the dish. In all cases the termites had moved to the disc containing the extract of fungus-invaded wood within ten minutes.

Example VII

The attractive principle obtained from extracting wood invaded with the fungus, *Lenzites trabea* with distilled water was mixed with a wettable Dieldrin powder. The resulting admixture was found to be highly effective in attracting termites to its location and in effecting a 100% kill of those termites coming in contact with it.

Having thus described the invention, what is claimed is:

1. An attractant for termites comprising as its essential active ingredient the solvent extract of wood which has been subjected to attack by wood-decaying fungi.
2. The attractant of claim 1 wherein the solvent extract is an aqueous extract.
3. A composition for controlling termites comprising the solvent extract of wood which has been subjected to attack by wood-decaying fungi and a termiticide compatible with the said extract.
4. The composition of claim 3 wherein the termiticide is Dieldrin.
5. An attractant for termites comprising as its essential active ingredient an aqueous extract of wood which has been subjected to attack by a wood-decaying fungus selected from the group consisting of white rots, brown-rots, and soft rots.
6. The attractant of claim 5 wherein the fungus is a brown rot.
7. The attractant of claim 6 wherein the brown rot fungus is *Lenzites trabea* Persoon ex Fries.
8. An attractant for termites comprising the aqueous extract of white pine sapwood which has been attacked by brown-rot fungus *Lenzites trabea* Persoon ex Fries.
9. A composition for controlling termites comprising the attractant of claim 7 and a termiticide and a vehicle as a carrier therefor.
10. A method for detecting termite infestations which comprises impregnating wooden stakes with the termite attractant of claim 1 driving the stakes into the ground in an area where termite infestation is suspected and subsequently excavating the stakes and the area immediately surrounding the stakes and assaying the termites present.
11. A method of preparing an attractant for termites which comprises inoculating wood with a culture of a wood-decaying fungus, subjecting the inoculated wood to conditions conducive to the growth and propagation of the fungus and, thereby, decay of the wood, and extracting the woods which has been attacked by the fungus with a suitable solvent.
12. The method of claim 10 wherein the wood-decaying fungus is *Lenzites trabea* Persoon ex Fries.
13. The method of claim 10 wherein the solvent is water.

References Cited in the file of this patent

Dethier: Chemical Insect Attractants and Repellents (1947), pages 223–224, published by The Blakiston Co., Philadelphia, Pa.

Mallis: Handbook of Pest Control (1954), 2nd Ed., pages 215–218. Published by MacNair-Dorland Co., 254 West 31st St., New York 1, N.Y.